No. 851,670. PATENTED APR. 30, 1907.
E. A. JOHNSTON.
HAY LOADER.
APPLICATION FILED DEC. 20, 1905.
4 SHEETS—SHEET 2.
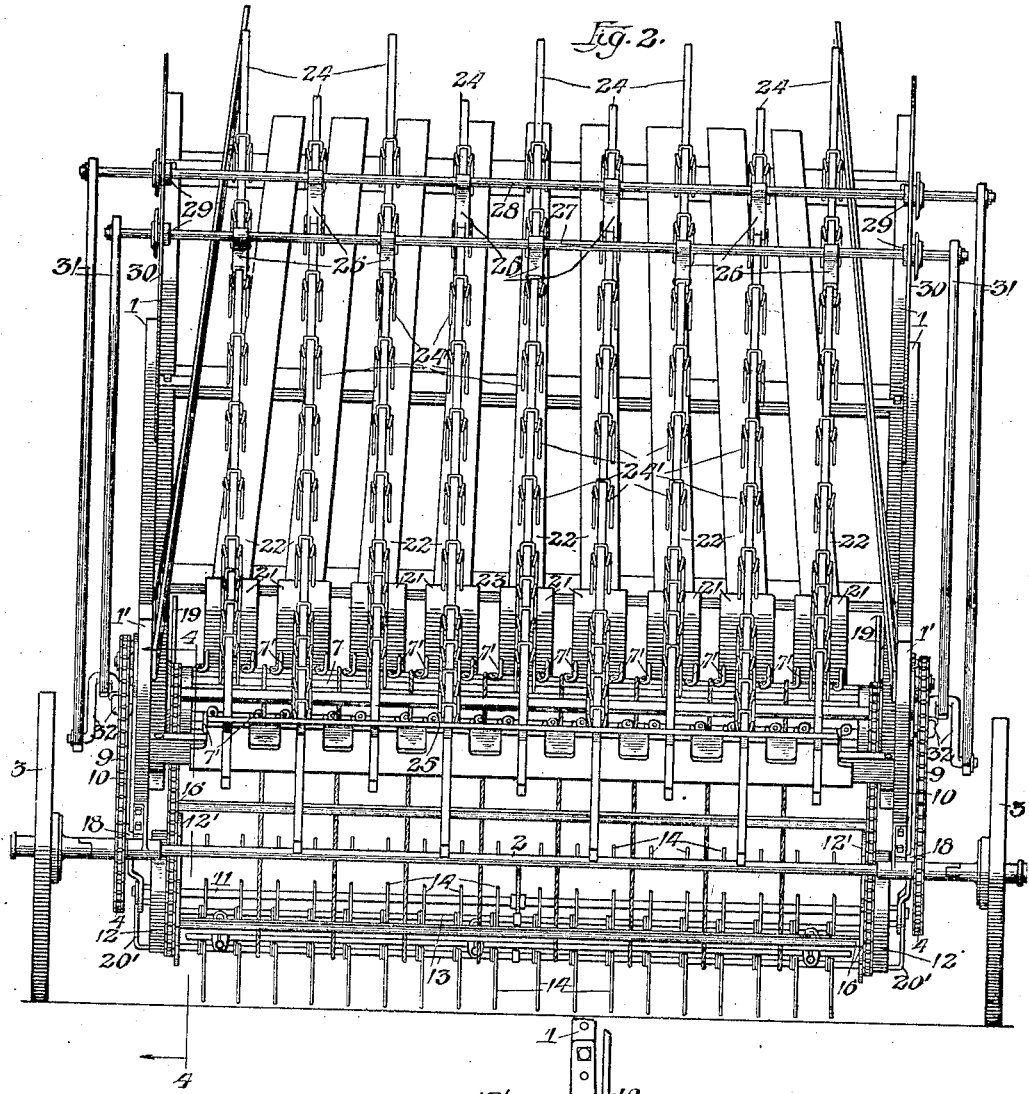
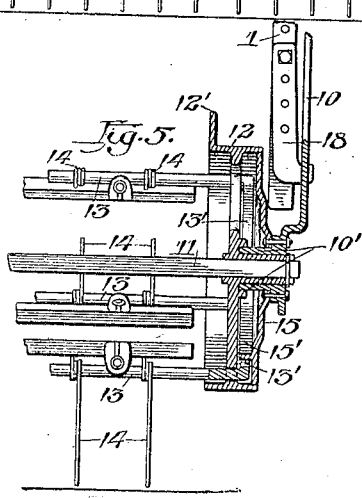
Witnesses:
Parker Randall.
Charles N. Hostetler.
Inventor
Edward A. Johnston No. 851,670. PATENTED APR. 30, 1907.
E. A. JOHNSTON.
HAY LOADER.
APPLICATION FILED DEC. 20, 1905.
4 SHEETS—SHEET 3.
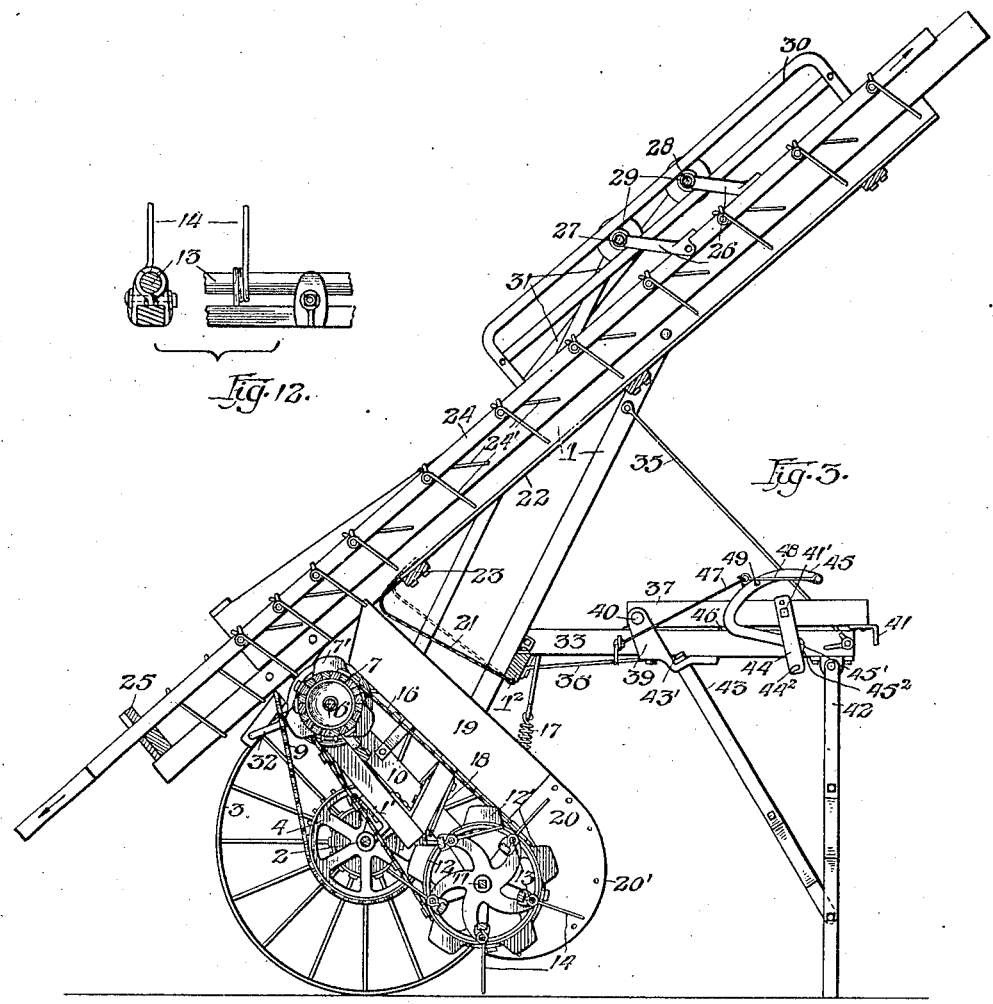
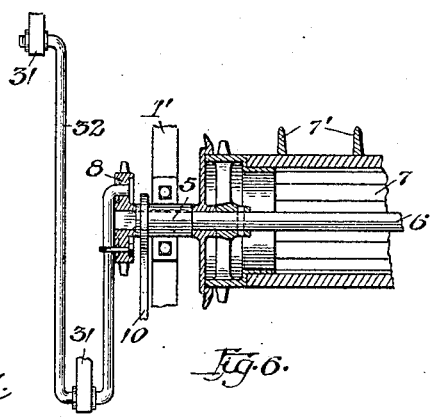
Witnesses:
Parker Randall
Charles N. Hostetter
Inventor:
Edward A. Johnston No. 851,670.
PATENTED APR. 30, 1907.
E. A. JOHNSTON.
HAY LOADER.
APPLICATION FILED DEC. 20, 1905.
4 SHEETS—SHEET 4.
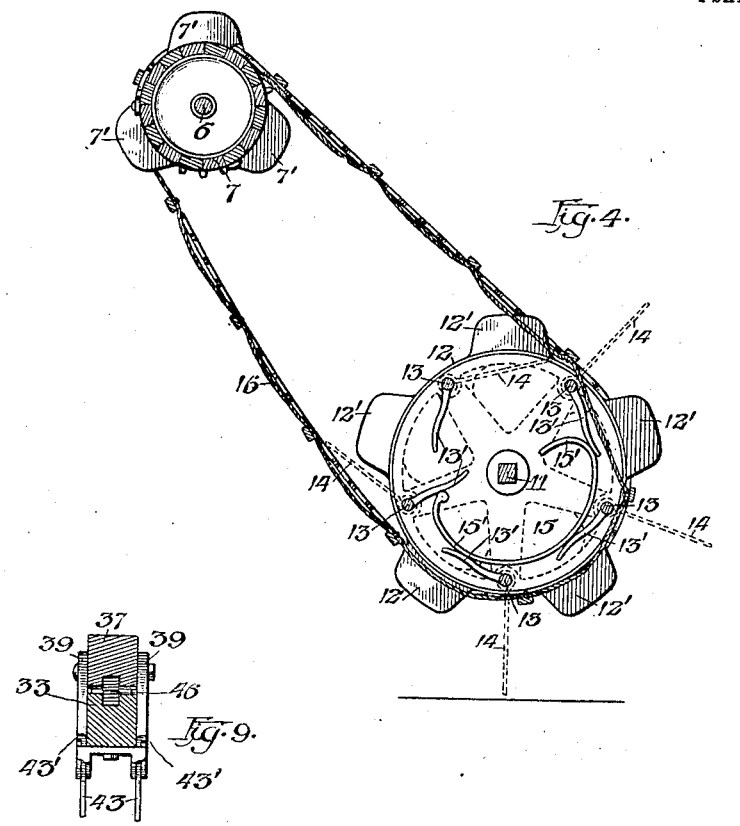
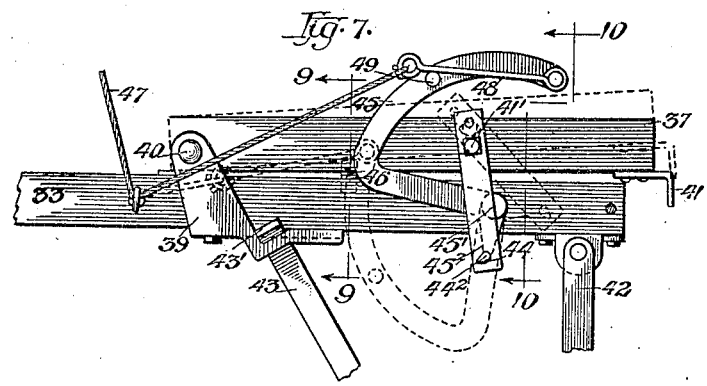
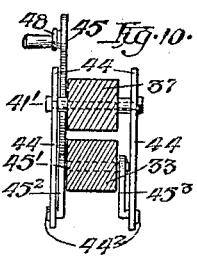
Witnesses:
Parker Randall.
Charles N. Hostetter
Inventor:
Edward A. Johnston.

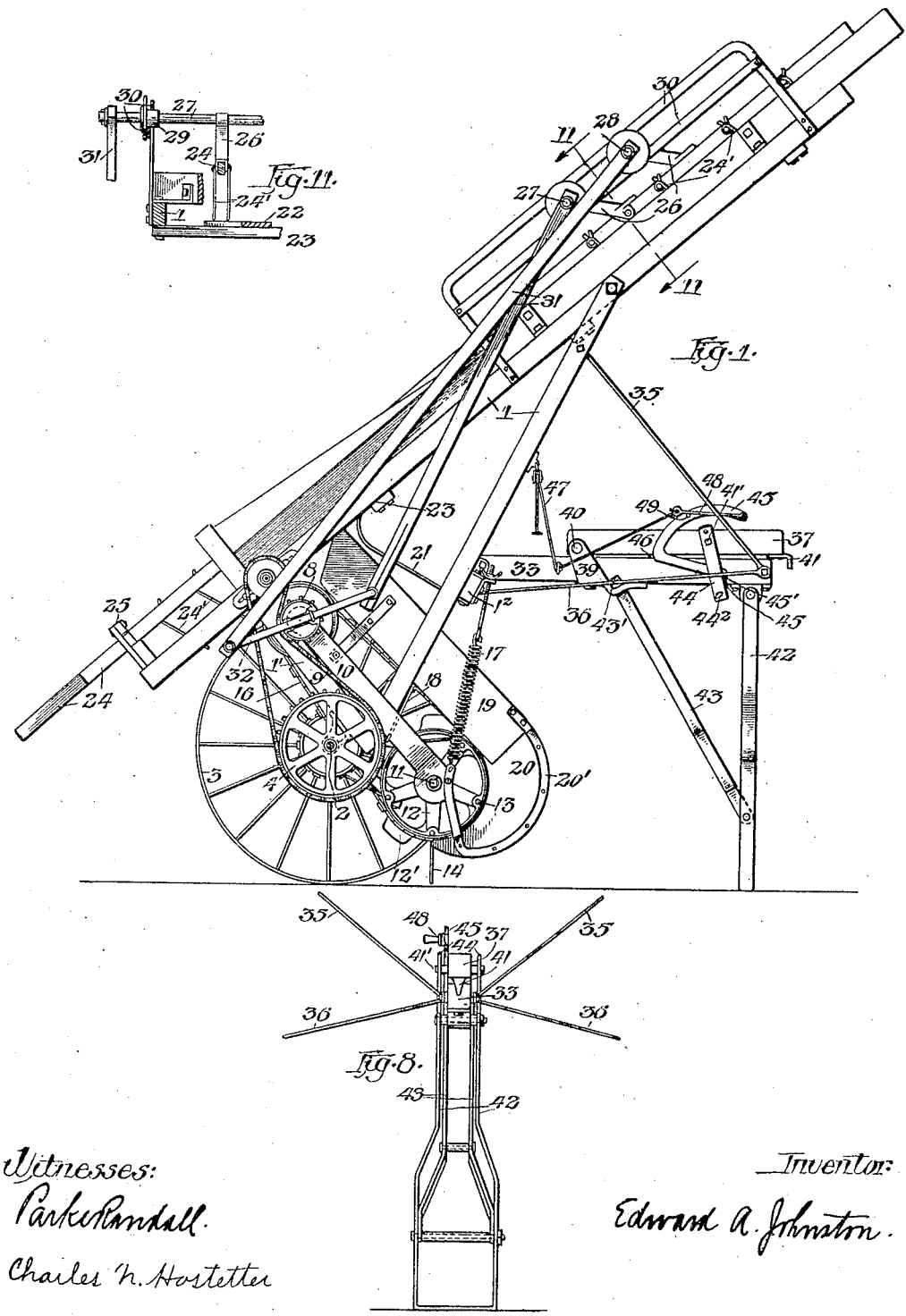

UNITED STATES PATENT OFFICE.

EDWARD ARTHUR JOHNSTON, OF STERLING, ILLINOIS, ASSIGNOR TO INTERNATIONAL HARVESTER COMPANY, A CORPORATION OF NEW JERSEY.

HAY-LOADER.

No. 851,670.   Specification of Letters Patent.   Patented April 30, 1907.

Application filed December 20, 1905. Serial No. 292,533.

*To all whom it may concern:*

Be it known that I, EDWARD ARTHUR JOHNSTON, a citizen of the United States, residing at Sterling, in the county of Whiteside and State of Illinois, have invented a new and useful Improvement in Hay-Loaders, of which the following is a complete specification.

This invention relates to hay loaders of the class which is hitched to the rear of a wagon and drawn across the field, the loader gathering the hay, elevating it and depositing it upon the wagon.

The object of the invention is to improve the general construction of a hay loader; to so arrange the several parts relative to the main axle that the machine will be well balanced and permitted to operate as closely as possible in the rear of the wagon; and also to improve the arrangement of the driving members for the gathering and elevating-carrier.

In hay loaders heretofore constructed the gathering device or carrier is usually placed in the rear of the main wheels, which results in a large part of the weight of the machine being in the rear of the axle, and results also in a greater required distance between the rear of the wagon and the gathering cylinder, thereby rendering it difficult not only to turn corners without missing hay, but also to pick up a divided swath.

My improved construction overcomes the above mentioned difficulty by a more favorable arrangement of the gathering-carrier, and also secures a simple and effective tongue hitch and a single means for driving the gathering-carrier and the elevating-carrier. The fact that the gathering-carrier is located in advance of the main wheel will readily permit the division of a swath, as the wheels will tread upon the unraked hay while the gathering device effects a separation of same.

Other improvements in the details of construction will appear in the following description and are set forth in the accompanying drawings, in which—

Figure 1 represents a side elevation of a hay loader embodying my invention, and Fig. 2 is a rear view of same. Fig. 3 is a central longitudinal section of the complete machine. Fig. 4 represents a detail section taken as indicated by the line 4—4 of Fig. 2, and designed to show the construction of the gathering-carrier. Fig. 5 is a longitudinal detail section taken through the left-hand end of the gathering cylinder. Fig. 6 is a detail section showing the manner in which the upper cylinder of the gathering-carrier is mounted on the main frame, and also the construction of the crank shaft for operating the bars of the elevating-carrier. Fig. 7 represents a detail view in side elevation of the tongue hitch, and Fig. 8 is a front elevation of same. Figs. 9 and 10 represent detail sectional views taken, respectively, on the lines 9—9 and 10—10 of Fig. 7. Fig. 11 is a detail sectional view taken on the line 11—11 of Fig. 1, and Fig. 12 is a fragmentary side and end elevation of the head of the gathering cylinder.

Referring to the drawings, the main frame 1 of the machine is constructed of two triangular shaped side frames, with suitable transversely extending connecting members therebetween. Near the lower corner of the frame are secured bearings, in which journals the main supporting and driving axle 2. The supporting wheels 3 are mounted upon the axle 2, and have the usual pawl and ratchet connection with the adjacent driving sprocket wheels 4. On the lower member $1^1$ of the main frame, near the upper end thereof and slightly in the rear of the axle 2, is journaled in the bearings 5 the shaft 6. On this shaft is secured the upper driving cylinder or drum 7 of the gathering-carrier. Sprocket wheels 8 are fixed to the outer ends of this shaft 6, the sprocket chains 9 connecting same with the driving sprockets 4 on the main axle. It is obvious, of course, that a series of wheels on the shaft 6 could be used instead of a solid drum and would be the functional equivalent thereof.

On the shaft 6 as a center is pivotally mounted the frame of the gathering-carrier, the said frame consisting essentially of the downwardly and forwardly projecting arms 10, which engage the outer ends of the hub bearings 5 and the square shaft 11 of the gathering cylinder, the hub of the cylinder head being interposed between said shaft 11 and the sleeve $10^1$ on the lower end of the arm 10. Rake heads 13, carrying the rake fingers 14, are mounted in the cylinder heads 12 near the periphery thereof, the rake heads being each provided with a cranked end 13¹ made to engage the cam track 15¹ on the cam 15, which is fixed to the lower end of one of the arms 10, as shown in Figs. 4 and 5, and the rake heads are controlled thereby in the usual well-known manner. The cylinder heads 12 are provided with a number of large radially projecting teeth 12¹, and on the drum 7, throughout its length, are arranged similar teeth 7¹, which operate as lifters to disengage the hay from the slatted endless carrier 16, which passes around the drum and cylinder and is driven by the teeth of the drum.

To yieldingly suspend the forward end of the frame which supports the gathering cylinder, adjustable springs 17 are interposed between a portion of the main frame and the lower end of the arms 10, while the adjustable stops 18 limit the extent of downward movement of said frame. Side boards 19, with sheet iron extensions 20, form shields or guards for keeping the hay within its proper channel. The curved bar 20¹ connects the board 19 with the lower end of the arm 10, strengthens the shield and also affords, at its inner end, a point of attachment for the spring 17. There is thus formed a gathering-carrier pivoted at its upper end at a point above and slightly in the rear of the axle 4 and projecting downward and forwardly, with its lower end adjustable and elastically suspended forward of the main axle of the loader.

In order to properly confine the hay upon the endless slatted conveyer 16 and between the end boards 19, elastic compressor bars 21 are provided, these bars being secured at their lower ends to the cross-sill 1² of the main frame 1, while their upper ends curve forwardly and overlap the lower ends of the bottom strips 22 of the elevator frame, as shown in Fig. 3. These spring compressor bars 21 are so arranged as to converge upwardly with respect to the top of the endless conveyer 16, thus forming a yielding throat at the delivery end of the gathering-carrier. The elevator frame is of the usual construction, its bottom, however, terminating at the cross-sill 23, which underlies the overlapping ends of the compressor bars 21, and to which is also secured the lower ends of the bottom strips 22 of the elevator frame.

To take the hay from the gathering-carrier as it is delivered from the upper end thereof, and on which it is moved in a direction transverse to the movement imparted to the hay after it is received by the elevating-carrier, reciprocating finger bars 24 are employed. These finger bars 24 are provided with the downwardly and forwardly projecting spring teeth 24¹. To control the bars at their lower ends a slotted guide strip 25 is provided, the bars being received and guided by the slots therein, as shown in Figs. 1, 3 and 11. The upper ends of the finger bars are supported by depending hangers 26 which are secured to the cross shafts 27 and 28, the alternate bars being supported by a different shaft. Each shaft is provided, on its end, with the rollers 29, which are made to move within the guide-ways 30 on each side of the frame of the machine, as shown in Figs. 1, 2 and 3. The hangers 26 are limited with respect to the extent of movement in a downward direction on the shafts 27 and 28, but are free to yield upwardly in order to permit the upper ends of the finger bars 24 to withdraw from the hay on their down strokes. To impart reciprocating movement to the shafts 27 and 28 a pitman connection 31 is provided between the ends of said shafts and the cranks 32, which are secured to the sprocket wheel 8 on the end of the driving shaft 6 of the upper cylinder 7, as clearly shown in Figs. 1 and 6. Each crank 32 is a double throw, oppositely arranged crank which connects with the lower end of the pitmen 31. Reciprocating elevating bars are thus provided, which are guided at their lower ends, and controlled and free to yield upwardly to a limited extent at their upper ends. It will thus be seen that both the gathering cylinder and endless conveyer, as well as the reciprocating elevating bars, are actuated from the single shaft 6.

As the endless conveyer 16 on the gathering cylinder and driving cylinder 7 extends practically at right angles to the reciprocating elevating finger bars 24, the direction of movement of the hay will not be reversed but will be made to move in a transverse direction at the junction of the gathering and elevating carriers, and the tendency to choke thereby lessened. If more hay is received by the endless conveyer 16 and the gathering cylinder than can pass through the throat between the compressor bars 21 and the top of said endless conveyer, the compressor bars will yield at their upper ends, as indicated by dotted lines in Fig. 3, thus increasing the capacity of the throat and effectually avoiding choking of the hay therein. It will also be observed that any choking tendency in the throat above the gathering-carrier will operate to press the gathering cylinder with more force against its work instead of permitting itself to be pushed away from its work by an increased amount of hay.

The fact that the gathering-carrier lies so closely above and in front of the main axle 4 will result in the machine being well balanced and also in a slight variation of the gathering cylinder with respect to the ground when a change of height is made in the wagon to which the loader is attached. If the loader is hooked to wagons of different heights, the hook or support 18 can be adjusted up or down on the main frame to limit the downward movement of the arms 10 of the frame of the gathering-carrier

What I claim as my invention and desire to secure by Letters Patent is:

1. In a hay loader, in combination, an axle, supporting wheels mounted thereon, an elevating-carrier including two series of reciprocating rake bars, a gathering-carrier comprising a carrier-driving shaft located above the axle and provided with double cranked ends, a drum secured to said shaft, an elastically suspended frame pivotally mounted upon said shaft and extending downward and forwardly therefrom, a gathering-cylinder mounted on the lower end of said frame and rotating forwardly at the ground line, and an endless conveyer engaging said drum and cylinder, and a direct pitman connection between the cranked ends of said driving shaft and the rake bars of said elevating-carrier.

2. In a hay loader, in combination, an axle, supporting wheels mounted thereon, an elevating carrier, an elastically suspended gathering-carrier free at its lower end and pivotally mounted at its upper end above the axle and extending downward and forwardly therefrom, and a series of elastic compressor bars fixed at their lower ends and arranged above said gathering-carrier, the fixed and free ends of said compressor bars overlying, respectively, the free and pivotally supported ends of the gathering-carrier, thereby forming a yielding throat through which the material is conveyed.

3. In a hay loader, in combination, an axle, supporting wheels mounted thereon, an elevating-carrier, an elastically suspended gathering-carrier pivotally mounted above the axle and extending downward and forwardly therefrom, and a series of elastic compressor bars arranged above said gathering-carrier and upwardly convergent with respect thereto, the said compressor bars being secured at their lower ends to the frame of the loader and having their upper ends curved to form a sliding connection with the bottom of said elevating-carrier.

4. In a hay loader, in combination, an axle, supporting wheels mounted thereon, an elevating-carrier, an elastically suspended frame pivotally mounted above the supporting axle and extending downward and forwardly therefrom, a gathering cylinder mounted in said frame and rotating forwardly at the ground line, a drum mounted at the fixed end of said frame, an endless conveyer engaging said drum and cylinder, side-boards secured to the frame and movable therewith, and a series of elastic compressor strips curved at their upper ends and slidably engaging at their upper ends with the bottom of the elevating-carrier.

EDWARD ARTHUR JOHNSTON.

Witnesses:
 PARKE RANDELL,
 CHARLES N. HOSTETTER.